G. L. DODDS.
FARM IMPLEMENT.
APPLICATION FILED DEC. 8, 1913.
1,111,011.
Patented Sept. 22, 1914.
2 SHEETS—SHEET 2.
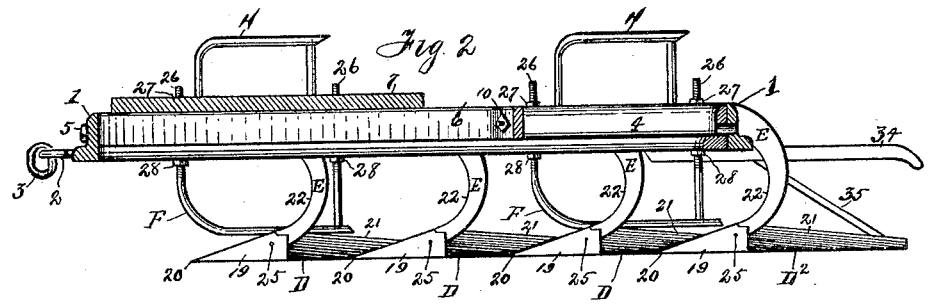
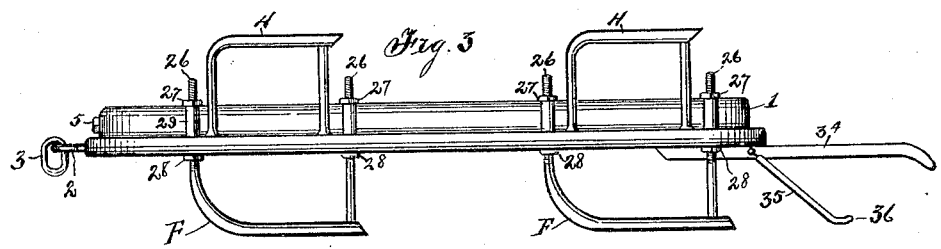
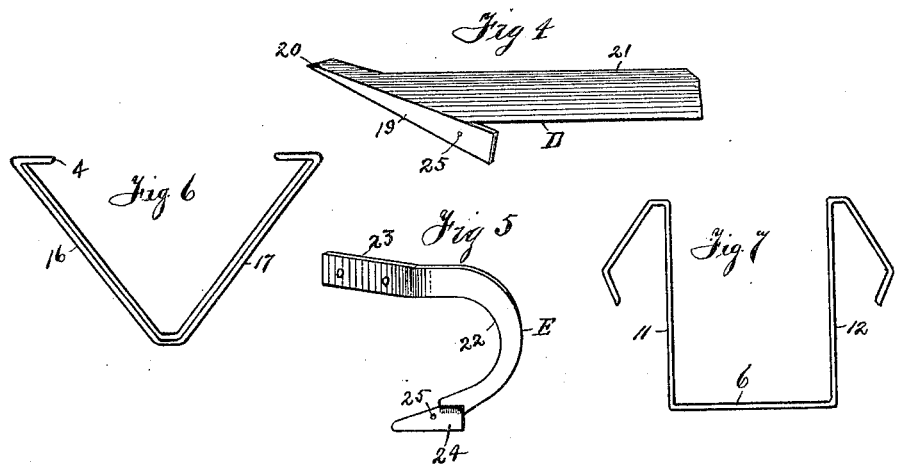
Witnesses
Elsie C. Thévenard.
Arreta A. Ferguson.
Inventor
George Livingstone Dodds
By D. R. O'Neail
His Attorney
THE NORRIS PETERS CO., PHOTO-LITHO., WASHINGTON, D. C.

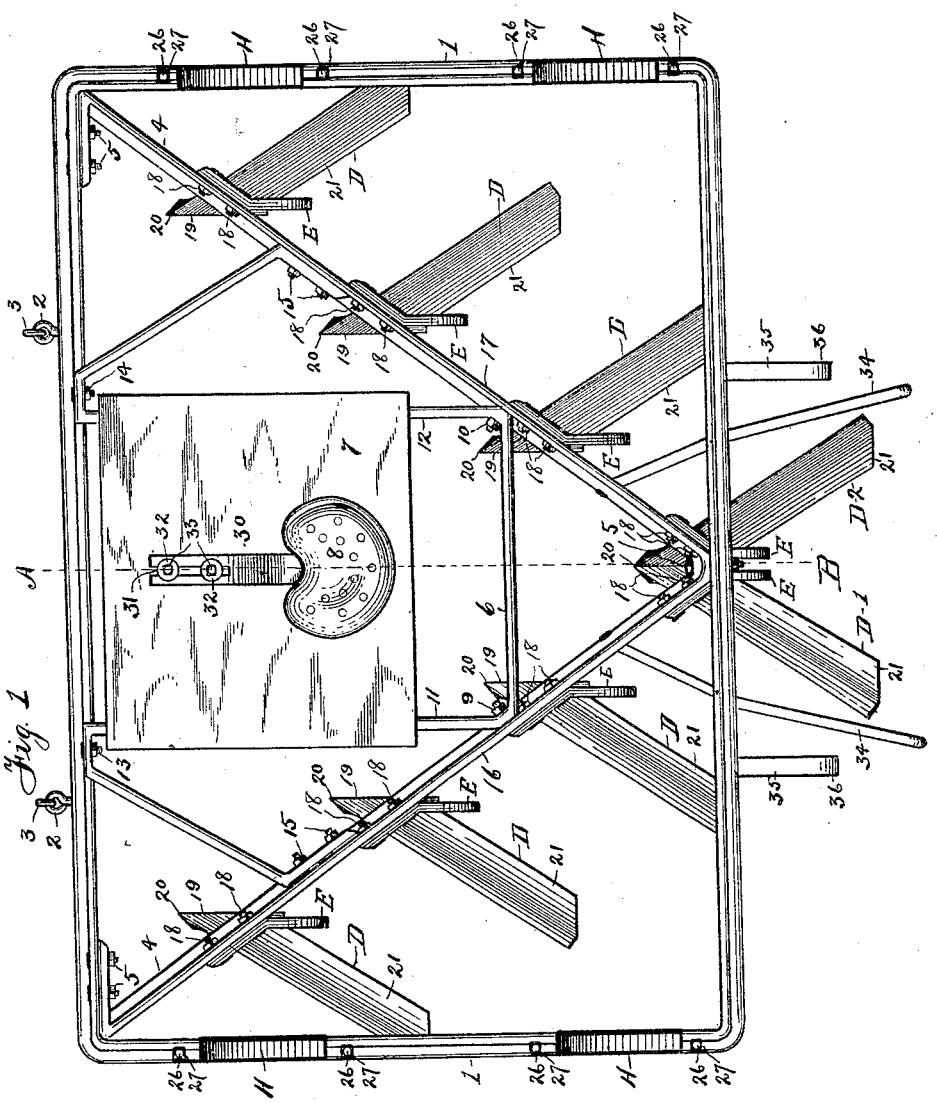

UNITED STATES PATENT OFFICE.

GEORGE LIVINGSTONE DODDS, OF WINNIPEG, MANITOBA, CANADA.

FARM IMPLEMENT.

1,111,011.  Specification of Letters Patent. Patented Sept. 22, 1914.

Application filed December 8, 1913. Serial No. 805,331.

*To all whom it may concern:*

Be it known that I, GEORGE LIVINGSTONE DODDS, of the city of Winnipeg, in Province of Manitoba, a citizen of the Dominion of Canada, residing at city of Winnipeg, in the Province of Manitoba and Dominion of Canada, have invented certain new and useful Improvements in Farm Implements, of which the following is a specification.

My invention belongs to the cultivator type of implement, and it has been designed with special reference to the requirements of that class of agriculture known as "dry farming", and with a view to overcoming certain difficulties to which that class of farming is subject.

The objects of the invention are to provide an implement of the type mentioned, specially adapted to follow the harvesting operation, uprooting the stubble and forming a seed bed of shallow depth, adapted to promote the rapid germination of the seeds of noxious weeds, and such other seed as would tend to produce a volunteer crop of any kind, were the land handled in the usual way. When such growth has been promoted, the implement is adapted to be again used, to the utter destruction of the crop so started, and with the resultant object of leaving the land in a smooth and clean condition, with a dust mulch overlying the subsoil of a sufficient depth to conserve the natural moisture contained therein.

I obtain the objects of my invention by the means described in the following specification and particularized in the claims, and fully illustrated in the accompanying drawings, in which similar characters refer to similar parts throughout the different views.

Referring to these; Figure 1 is a plan view of the entire implement. Fig. 2 is a sectional view of one half of the implement taken upon the line A—B in Fig. 1. Fig. 3 is an end view of the frame showing the attachment of the shoes or runners above and below. Fig. 4 is a view of a right hand blade. Fig. 5 is a view of one of the blade carrying standards or goose-necks. Fig. 6 is a view of the triangular blade carrying frame much reduced in size. Fig. 7 is a view of the platform carrying frame.

In the different views I indicate the main frame which is preferably rectangular in shape, and which may be made of angle iron as being an article suitable for the purpose, both as to strength and weight. The frame 1 is made of a size sufficiently large to inclose the working parts of the implement on three sides, thus preventing injury by them to trees or shrubs adjacent to the path traversed by the implement. Eye bolts 2 carrying rings 3 are shown projecting forwardly from the frame 1, by means of which the implement may be hitched to a source of power either animal or mechanical as may seem advisable.

Within the frame 1 is a second or blade carrying frame 4 preferably triangular in shape as shown in Figs. 1 and 6 with its vertex to the rear, and secured to the frame 1 by means of the bolts 5. The frame 4 may also be of angle iron preferably with the angle faced inwardly in order to present a smooth outer face to which to secure the goose-necks described later on.

Within the triangle 4 is a third frame 6 having a rectangular portion to which is secured a platform 7, which in turn supports a seat 8 for the convenience of the operator. The corners of the frame 6 are securely bolted to the sides of the triangle 4 by the bolts 9 and 10 while the sides 11 and 12 extend forward to the front of the frame 1 to which they are secured by the bolts 13 and 14, thence extending in brace fashion back to the sides of the triangular frame 4 to which they are secured by the bolts 15. It will be noted that the style of bracing shown, that is to say, frames within frames and of the shape indicated, forms a particularly strong construction without unnecessary weight, and one well adapted to resist any racking strain due to the implement striking an impediment at any particular point of its length.

The operative parts of the implement consist of a series of blades D progressively arranged at a suitable distance below the triangular frame 4, and provided with standards or goose-necks E which are secured to the sides 16 and 17, of the frame 4 by bolts 18. It will be noted that the blades D (Fig. 4) consist of a landside 19 running parallel with the line of draft, a somewhat chisel shaped point 20 adapted to uproot the stubble encountered, and a laterally and rearwardly extending blade portion 21 sharpened upon its forward edge and adapted to travel upon a plane slightly below the surface of the ground and parallel therewith, shearing off the roots of the weeds, etc., met with in its progress. The shape of the frame 4 provides a ready means whereby the blades D may be arranged in progressive series along the sides 16 and 17 of the triangle, the portion 21 of each trespassing slightly upon the ground treated by the preceding blade, thus insuring the even treatment of all the ground traversed by the implement. The goose-necks E (Fig. 5), are curved in such manner as to offer as little resistance to the soil as possible, and the inner line 22 of the curve is ground to a reasonably fine edge for the same purpose. The upper portions 23 of the standards E are offset to conform to the direction of the sides 16 and 17 of the triangular frame 4, to which they attach. The lower ends of the standards E are provided with foot portions 24 which fit in behind the landsides 19, to which they are secured by bolts which pass through the openings 25 in each. It will be understood that the securing of the blades D to the standards E is a detail which may be performed in any suitably secure manner.

It will be noted that the foot portion 24 of the standard E is set back from the curved portion thereof the thickness of the land sides 19, so that the face of the curved portion of the standards comes in line with the face of the landsides 19 and the inner line 22 of the curved portion forms an unbroken line with the upper edge of the landsides.

The blades D¹ and D² at the vertex of the frame 4, it will be noticed, are placed with their landsides facing each other and close together, thus in a manner these two blades operate as one, to take care of the ground untouched by the preceding blades which are disposed in fan fashion along the sides 16 and 17 of the frame 4, with their landsides 19 on the inside and their blade portions 21 extending outwardly. Thus there are two series of the blades D oppositely disposed to each other, and extending from the apex to the base of the triangle 4, and these blades may be as numerous as is deemed desirable and as may be consistent with the size of the implement.

The distance to which the blades D may enter the ground is regulated by the position of the runners F. These, as is shown in Fig. 3, are carried by upwardly extending screw-threaded standards 26 which pass through openings in the frame 1, nuts 27 and 28 being provided upon them above and below the frame 1, by which the distance between the runners and the frame may be adjusted at will. Thus, as the runners F, travel upon the surface of the ground, if they are set close to the frame 1 the blades D will enter the ground to a greater depth than if the distance between the frame and runners were greater.

The numerals 29 indicate thimbles set between the nuts 27 and the frame 1, and which merely serve to raise the nuts 27 to a position handy to operate. The seat 8, it will be noticed, is carried by a standard 30, provided with a slot 31 adapted to allow of the end of the standard passing under the washers 32 where it is held by tightening up the nuts 33. Thus the seat is easily removable.

When it is desired to move the implement from place to place without operating it, the seat 8 is removed and the implement overturned, where it rests upon the upper runners H with the blades D in the air in which position it may be drawn to any point desired.

34 are handles secured to the frames 1 and 4 and projecting out behind, by means of which the rear of the implement may be raised should it be necessary to clear the blades D from any accumulation of rubbish. Legs 35 loosely secured to the frame 1 are adapted to trail behind when not in use, but to stand under and support the implement when raised by the handles 34. The legs 35 end in a curved portion 36 which rests upon the ground when they are being used as supports, and prevent them sinking into the ground to any great extent.

Having thus described the mechanical arrangement of the implement it will be further understood that the forward or cutting edges of all the blades lie upon the same horizontal plane, while the surface of each forms an inclined plane of about 45 degrees sloping up from the cutting edge to the rear.

Having first ascertained the particular class of work required of the implement and having set the shoes or runners F for the required depth, which may be varied from one to several inches, the operation will be as follows:—The operator will take his place standing as far forward upon the platform 7 as possible, in order to tilt the forward part of the implement downward and allow the points 20 of the first pair of blades D to enter the ground to the depth allowed by the runners F, this action will also cause the points of the following blades to enter the ground in the same way and to the same depth, after which the implement will proceed upon the level, the blades D pursuing a course slightly below the surface of the ground, and parallel therewith. As the wing portion 21 of each of the blades after the first pair overlaps somewhat upon the ground treated by the blades it follows, it will be seen that all the ground passed over by the implement receives equal treatment. Owing to the manner in which they are set it will be noted that the action of the wing portions 21 of the blades D is a forward slicing and cutting action similar to the angle stroke of a razor upon the face, and well adapted to sever the roots of weeds or other growths met with in their course, while the chisel like points 20 are particularly well adapted to the uprooting of the stubble left after harvesting operations. The action of the implement might be described as that of a plane, which, traveling slightly below the surface of the ground takes off a shaving consisting of the surface soil, the tops of weeds and stubble; the shaving traveling up the incline surface of the blades sifts over the rear edge, becoming disintegrated and pulverized and the separated weeds being the lighter fall upon the surface, when their tender parts being exposed to the air they are killed and prevented from reseeding.

In addition to being a weed destroyer without an equal, the implement is particularly valuable as a means of conserving the natural moisture of the earth. It is a well known fact that the earth is filled with tiny pores, and, that due to the action of the atmosphere, a capillary action is constantly taking place which brings the natural moisture of the earth to the top when it is evaporated and lost. Immediately after harvest this action is much accelerated by the stubble which acts in the manner of wicks. If the implement be used immediately after harvest this trouble is avoided, the stubble being uprooted, the course of the pores previously mentioned, broken, and the surface of the soil left with a smooth even dust mulch which effectually prevents the evaporation which would take place were the soil left to bake as is usually done. By this means as previously stated, the weeds and such seeds as would produce a volunteer crop are promptly killed; any other form of cultivator or disk works the land too deep, and ridges it, so that the land is left too open, which allows it to dry out, so that seeds never sprout till they come with or ahead of the grain, and they are never killed. For the same reason the implement is very valuable in summer fallowing operations, the proximity of the earth's particles being destroyed, capillary attraction broken up and evaporation arrested.

From the foregoing it will be understood that the action of the implement differs from that of a plow in that it does not turn a furrow, and differs from a disk or cultivator in that no ridging whatever of the soil takes place.

Having thus fully described and pointed out the advantage of my invention what I claim is:—

1. A farm implement comprising a runner supported rectangular frame, a triangular frame inclosed by and secured to said rectangular frame, the base of said triangle at the front and the vertex at the rear, cultivator attachments arranged in spaced relation to each other along and below the sides of said triangle, and their standards secured to the sides thereof, whereby said attachments are adapted to follow each other upon spaced apart and parallel lines, each of said attachments comprising a landside, a point and a horizontally disposed diagonally extending blade, said attachments traveling slightly below the surface of the earth, their landsides defining the distance between their lines of travel, their points uprooting stubble and similar obstructions, and their blades extending across the spaces between said lines of travel and separating the surface from the subsoil, and redepositing said surface soil without ridging, and means regulating the depth of said attachments below the surface of the soil.

2. A farm implement comprising a rectangular outer frame, and a triangular inner frame surrounded by and secured to said outer frame with its base to the front and its vertex to the rear, the sides of said triangle adapted to carry cultivator attachments their standards secured thereto, each of said attachments consisting of three integral parts, a landside, a point and a horizontally disposed laterally extending blade, said attachments being distributed in pairs, a member of each pair pertaining individually to each of said sides and being similarly disposed thereto, the first of said pairs located contiguous to the base of said triangle, their points projecting forwardly, their landsides disposed in alinements with the line of draft of said implement, and their blades extending outwardly, said first pair of attachments being followed at regular distances apart by similarly disposed and secured pairs of attachments, the last of said pairs being located at the vertex of said triangular frame with their landsides adjoining each other, the blades of each of said pairs of attachments traveling just below the surface of the ground and extending across to the ground covered by the blades of the preceding pair, said attachments collectively working all the soil passed over by said outer frame.

3. A farm implement comprising a substantially rectangular outer frame, a triangular frame disposed within and secured to said rectangular frame, the base of said triangle at the front and its vertex at the rear, a three sided rectangular frame within said triangular frame, the corners of said three sided frame secured to the sides of said triangular frame and the longitudinal sides of said three sided frame running to the front bar of said outer frame and being secured thereto, and being then turned back in brace fashion and secured to the sides of said triangular frame, said outer and triangular frames being thereby braced to and from each other and their relative positions to each other insured, said triangular frame being adapted to carry a plurality of cultivator attachments, adapted to work the surface of the soil without ridging it, said outer frame being carried by runners adjustable to or from said frame to regulate the depth of said cultivator attachments in the soil, and said implement being adapted to be tilted forward and downward on said runners to allow the points of said cultivator attachments to enter the soil.

4. A farm implement comprising a rectangular outer frame and a triangular frame surrounded by, suitably braced, and secured thereto, said triangular frame carrying cultivator attachments adapted to work the surface of the ground without ridging it, said outer frame being carried by runners adjustable as to height to regulate the depth of said attachments in the soil, and having runners on its upper side adapted to carry it when it is overturned, and by which it may be moved from place to place with said cultivator attachments in inoperative position.

In testimony whereof he has affixed his signature in presence of two witnesses.

GEORGE LIVINGSTONE DODDS.

Witnesses:
 ELSIE C. THÉVENARD,
 ARRETA FERGUSON.

---

Copies of this patent may be obtained for five cents each, by addressing the "Commissioner of Patents, Washington, D. C."